United States Patent [19]
Sahnas

[11] 3,792,691
[45] Feb. 19, 1974

[54] AIR COOLED ANTIPOLLUTION ENGINE

[76] Inventor: George Sahnas, 6032 W. Irving Park Rd., Chicago, Ill. 60634

[22] Filed: Sept. 15, 1971

[21] Appl. No.: 180,649

[52] U.S. Cl. ......... 123/26 R, 123/32 ST, 123/75 B, 123/139 AW
[51] Int. Cl. ........................................... F02b 41/00
[58] Field of Search........123/26 R, 75 B, 139 AL, 123/139 AW, 32 ST 123/32 ST

[56] References Cited
UNITED STATES PATENTS

| | | | |
|---|---|---|---|
| 1,580,420 | 4/1926 | Dempsey | 123/75 B |
| 1,825,817 | 10/1931 | Patterson | 123/75 B |
| 2,196,071 | 4/1940 | Hudson | 123/75 B |
| 2,890,690 | 6/1959 | Dolza | 123/139 AL |
| 2,897,808 | 8/1959 | Suttle | 123/139 AL |
| 3,094,976 | 6/1963 | May | 123/139 AW |
| 3,129,702 | 4/1964 | Arbanas | 123/139 AL |
| 3,182,645 | 5/1965 | Wilson | 123/26 |
| 3,266,234 | 8/1966 | Cook | 123/32 ST |

*Primary Examiner*—Wendell E. Burns
*Attorney, Agent, or Firm*—Root & O'Keeffe; Lloyd C. Root

[57] ABSTRACT

An antipollution engine admits supercharged or compressed air into each cylinder each time the piston therein moves downwardly and just before it reaches lower dead center. This compressed air in addition to the atmospheric air which mixes with the fuel and is ignited. The compressed air for each cycle enters the cylinder the first time on the downward stroke of the piston when the mixture of fuel and atmospheric air is admitted through the intake valve. After ignition a second charge of compressed air is admitted just before the next time the piston reaches lower dead center. This second charge not only cools the cylinder and piston, but also insures further and complete burning of the combustion gases so that the gas which is exhausted is clean and pure.

6 Claims, 5 Drawing Figures

INVENTOR:
GEORGE SAHNAS

AIR COOLED ANTIPOLLUTION ENGINE

BRIEF SUMMARY OF THE INVENTION

The invention relates in general to an internal combustion engine which embodies an antipollution system which cleans and purifies the combustion gases in the exhaust.

More particularly, the invention embodies a novel form of fuel pump adapted to be used for the antipollution system which is so constructed as to vary the amount of fuel injected into each cylinder, depending upon the speed of the engine. The engine is of the internal combustion type and uses diesel oil for fuel but spark plugs are used to ignite the fuel and air mixture rather than ignition being automatic as in diesel engines.

Each cylinder is provided with an intake valve and exhaust valves, but the area of the exhaust valves combined is greater than that of the intake valves. The engine is provided with usual intake and exhaust manifolds in communication with the intake and exhaust valves, but in addition to the normal atmospheric air intake there is a supercharge of air at higher pressures which is admitted into the cylinder and above the piston therein each time the piston moves downwardly. For best results it has been determined that this admission of air from the supercharger into each cylinder begins to take place approximately 42° before the piston reaches lower dead center and stops approximately 42° after reaching lower dead center.

A special type of fuel pump has also been designed which is particularly adapted for use in connection with the present system, all of which will be more particularly referred to as the description proceeds.

In view of the foregoing it is a principal object of the present invention to provide a novel antipollution system for an internal combustion engine so that the exhaust gases therefrom will not have any polluting affect on the surrounding atmosphere.

A further object of the invention is to provide an antipollution system for an internal combustion engine wherein supercharged air is admitted into each cylinder twice during each cycle in such a way as to cool the engine and to create a further burning of the combustion gases, whereby any of the gases which otherwise would pollute the atmosphere are consumed by ignition, thereby purifying the exhaust.

A still further and more specific object of the invention is to provide a novel form of fuel pump for use in connection with the aforesaid system.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings forming a part of this application.

DETAILED DESCRIPTION

Figure 1:
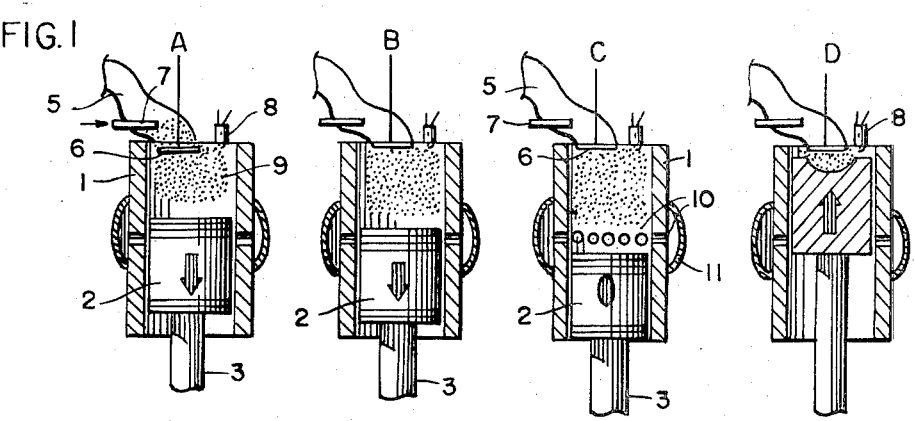
FIG. 1 is a diagrammatic illustration of the injection of fuel and air into the cylinder and the ignition thereof, and is divided into four positions of the piston and intake valve A, B, C and D.
Figure 2:
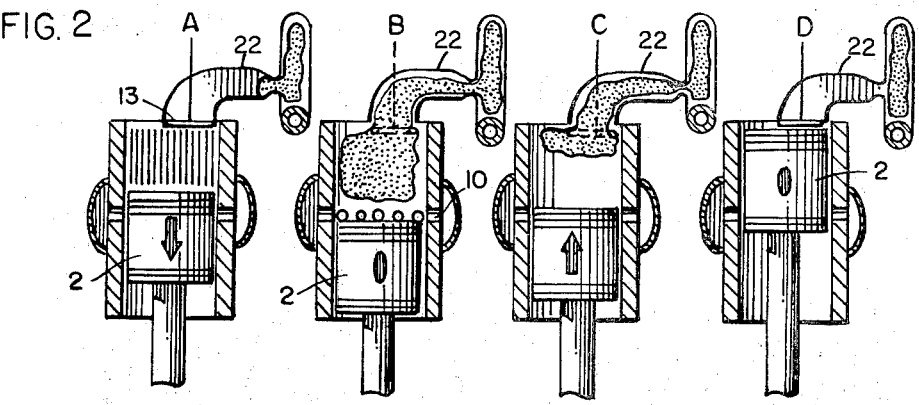
FIG. 2 is a similar diagrammatic illustration of the second part of the cycle illustrating the conditions within the cylinder after ignition, and is likewise divided into the four positions A, B, C and D.

It is thought that the construction and operation of the air cooled antipollution engine of the present invention may best be understood by first describing the various steps which take place during a cycle. To this end reference is more particularly made to FIGS. 1 and 2. In the diagrammatic illustrations of these figures, one cylinder and piston assembly is shown and it will be understood that the diagram likewise illustrates what occurs in all of the cylinders of a given engine.

In each of these figures there is shown a cylinder 1 having a piston 2 reciprocable therein. The piston rod 3 is connected in the usual and well known manner to a crankshaft so that rotation of the shaft will drive the pistons in their reciprocating movements within the cylinders. Atmospheric air from the intake manifold 4 (see FIG. 3) travels through the conduit or valve passage 5 to the cylinder head and will be admitted into the cylinder in the usual manner when the intake valve 6 is open.

The numeral 7 illustrates the fuel injector which receives fuel under pressure from the fuel pump and injects it into the passage 5. Preferably, the angle of injection with respect to the wall of the passage against which the fuel impinges is about 45°.

A spark plug 8 is provided in the cylinder head for ignition of the air and fuel mixture. FIG. 1A shows the intake valve 6 open and admitting a mixture of fuel and atmospheric air 9 above the piston and in the upper part of the cylinder. In this figure the piston is moving downwardly.

In FIG. 1B the piston 2 is shown as having moved down a further amount, and in FIG. 1C the piston 2 is shown as in its lower dead center position. At this time the intake valve 6 is closed.

It will be noted that the cylinder 1 is provided with a plurality of ports 10 through the wall thereof and circumferentially spaced therearound. Outwardly of these ports 10 and around the cylinder there is provided a manifold 11 suitably connected to the centrifugal compressor or supercharger 12 (see FIG. 3). Thus, an amount of compressed air in excess of atmospheric pressure, and preferably at about 4 pounds psi, will enter the cylinder through the ports thereupon generating a turbulence in the mixture of air and fuel and forces the fuel upwardly in variable magnitudes. As mentioned hereinbefore, these ports are normally closed throughout the greater part of the cycle by the piston but will open approximately 42° prior to lower dead center, and will remain open through approximately 84 degrees of revolution so that they will again close at about 42 degrees after passing through lower dead center.

FIG. 1D illustrates the piston 2 in its upper dead center position compressing the air and fuel mixture, at which time ignition by the spark plug 8 takes place, thereupon driving the piston downwardly. FIG. 1A through D illustrate the injection of fuel and air into the cylinder and shows the opening and closing of the intake valve. FIG. 2A through D illustrate what takes place after ignition, wherein FIG. 2A shows the piston 2 being driven downwardly.

FIG. 2B shows the cylinder 2 in its lower dead center position again, and the gases of combustion are present above the piston. The exhaust valves 13 are still closed in FIG. 2A but are open as shown in FIG. 2B. At this point again the ports 10 have been opened by downward movement of the piston, whereupon a second charge of air from the compressor 12 will be admitted into the cylinder through such ports.

When the supercharged air first entered the cylinder and during the combustion of the fuel and air mixture the lighter particles of the fuel will have flowed upwardly and the heavier particles remain in the lower part of the mixture. Thus, the fuel will separate into three magnitudes, wherein substantially 30 percent of the fuel will aerate and remain near the top of the cylinder where it will achieve highest temperature. Approximately 30 percent of these small particles will remain below the aerated fuel and the remaining 40 percent will remain in larger droplets below the small particles. Below the larger droplets the space above the piston will contain cooler air which, at the first turbulence of the fuel, will absorb the temperature thereof at ignition and helps the burning of the larger particles, thereupon protecting the piston at high temperatures.

From 5° to 20° before top dead center the aerated fuel will be ignited. This begins with the aerated fuel and the pressure rises initially to 30 to 32 atmospheres. Thereafter the burning of the remaining particles begins but the temperature and compression of the fuel remain substantially constant throughout the changing mass thereof. The burning temperature will be about 2,800° F., and when the piston is driven downwardly the exhaust valves open about 65° prior to the lower dead center position, at which time the pressure in the cylinder falls about 40 pounds psi and the temperature of the air is 1,150° F.

As mentioned above, and as will be referred to more specifically hereinafter, there are two exhaust valves 13, as may be seen in FIG. 3, and the total area of these exhaust valves is preferably twice that of the intake valve. This creates a faster drop of pressure in the cylinder and enables displacement of the burning air and fuel sooner into the exhaust chamber in order to start the secondary burning at the chamber. The admission of the supercharged air as shown in FIG. 2B when the piston is on its way upwardly the second time in the cycle feeds additional oxygen to the hot air and fuel mixture, thereby enabling a second burning of the gases. At this point when the exhaust valves are opened and the ports 10 are uncovered by the piston, the pressure of the burning air in the cylinder will fall up to 2 pounds and the temperature will be reduced to about 800° F.

Also, upward movement of the piston as in FIG. 2C forces the burning air outwardly into the exhaust manifold 14 through the exhaust valves 13, thereby cooling the surface of the piston and walls of the cylinder and absorbs the heat created by the burning air. In this manner it cools the motor and expands the atmospheric air. Therefore, the engine is air cooled from inside the cylinders.

A turbine 15 is connected by a shaft 16 to the centrifugal compressor 12 and drives such compressor. The absorbing of the heat by the supercharged air cools the motor and expands the air in the exhaust manifold, whereupon the pressure thereof will exceed the pressure of the burning air and drives the turbine. It will be noted in FIG. 3 that the exhaust manifold 14 has a passage 17 in communication with the turbine 15, whereupon to drive the turbine and the compressor.

FIG. 2D illustrates the piston 2 at its upper dead center position and with the exhaust valves closed it is there indicated that the cooler air will absorb the heat from the walls of the cylinder. Also, about 70 percent of the heat from the exhaust valve is absorbed, thereby cooling the top of the cylinder. Part of the cool air remains in the exhaust chamber 22 and the remainder thereof passes through the passage 17 to the turbine where it drives the turbine and is exhausted through the exhaust pipe 18. Thus, the admission of the supercharged air helps to burn the combustion gases and hot air, reducing the temperature thereof and cleaning the exhaust so that pollution of the surrounding air will be eliminated.

Figure 3:
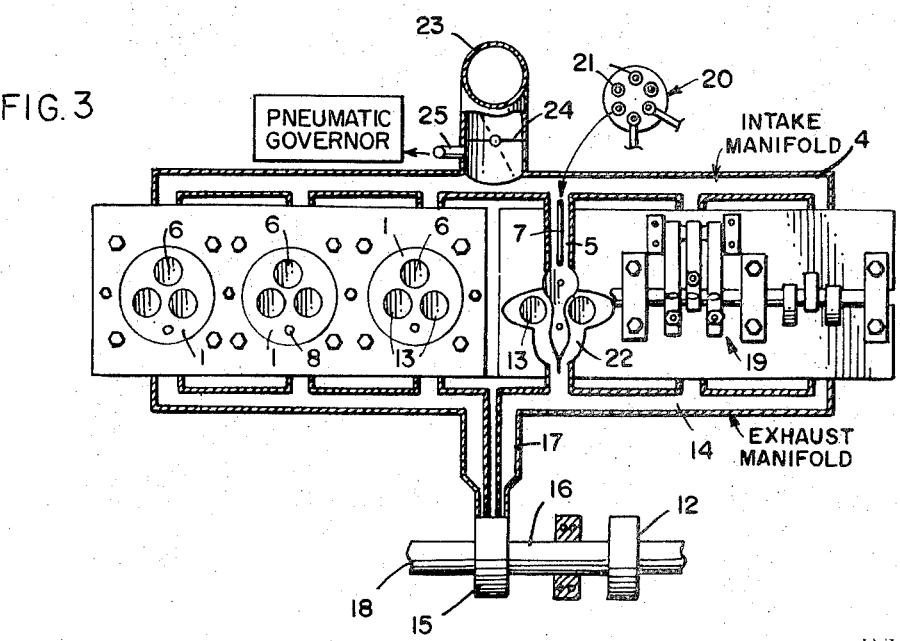
FIG. 3 is a somewhat diagrammatic plan view partly in section of an engine embodying the present invention.

Further referring to FIG. 3, there is shown a typical six cylinder engine wherein three of the cylinders 1 have been shown. The intake valves 6 are illustrated as well as the exhaust valves 13 and the spark plugs 8. The camshaft is indicated generally by the numeral 19 and is driven in the usual manner for reciprocating the valves. The fuel pump which is embodied as a part of the present invention is indicated generally by the numeral 20 in FIG. 3, and is shown as having a number of fuel outlets 21, each of which leads to the fuel injector 7 of a cylinder. Also in FIG. 3 there is illustrated the exhaust chamber 22 into which the combustion gases and the cooling supercharged air is admitted through the exhaust valves 13. This chamber leads to the exhaust manifold 14 and thence to the turbine as above described. The chamber 22 may be referred to as a purifying chamber since the exhaust gases begin to be cleaned at this point.

The intake for the atmospheric air is illustrated at 23. Atmospheric air is drawn into this pipe, wherein there is disposed a butterfly valve 24. A pneumatic governor (not shown) of well known type (as illustrated, for example, in Schweizer Pat. No. 2,751,897) is associated with the valve 24 through the conduit 25. As will be noted hereinafter, manual control of the fuel pump for regulating the amount of fuel admitted into the fuel injector will operate the pneumatic governor to correspondingly open or close the butterfly valve 24 and regulate the amount of atmospheric air being taken in.

Figure 4:
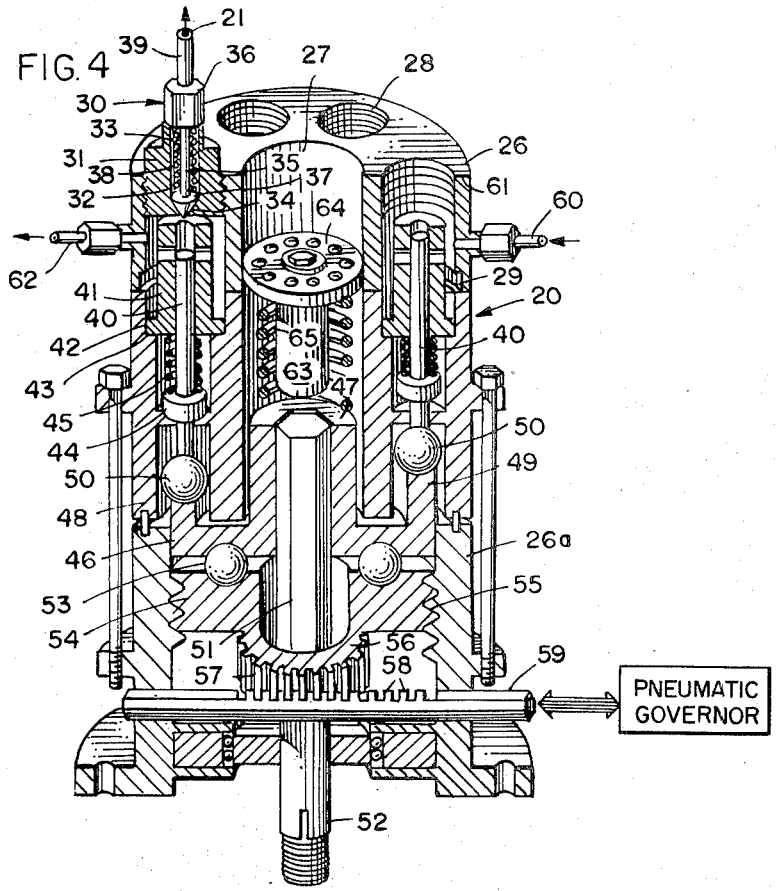
FIG. 4 is a perspective view in vertical cross section of the fuel pump which has been designed for use with the system of the invention.

FIG. 4 illustrates the novel form of fuel pump which has been referred to hereinabove and is designated generally by the numeral 20. This consists of an elongated body portion 26 having a central bore 27 extending therethrough. Around the central bore 27 there is a plurality of other bores 28 in spaced relation with each other but communicating with each other by a suitable passageway such, for example, as that shown at 29.

Each of the bores 28 is threaded at its upper end and is adapted to receive a check valve generally indicated at 30. This check valve consists of a body portion 31 externally threaded as at 32 and having an internal bore 33 and a valve seat 34 at the lower end thereof. A valve member 35 has a lower end formed so as to have a complementary surface to the valve seat 34. The valve 35 is adapted to reciprocate, in the body 31 and the nut 36 thereon, between open and closed positions. The stem of the valve 35 is provided at its lower end with a shoulder 37, against which a coiled compression spring 38 bears. The upper end of the spring bears against the nut 36, thereby to normally maintain the check valve in a closed position. The upper end of the valve has a connecting pipe 39 which is connected to a fuel injector 7 so that upon opening of the valve fuel will be forced under pressure through the pipe 39 to the fuel injector.

Mounted within each of the bores 28 and below the corresponding check valve therein there is provided a plunger 40 adapted to be reciprocated within a plunger guide 41. The plunger guide has a flange 42 at its lower end adapted to bear against an internal shoulder 43 within the bore 28. The guide 41 is held against the shoulder by the body 31 of the check valve.

The plunger 40 is provided with a flange 44 adjacent the lower end thereof but spaced upwardly therefrom so that a portion of the plunger extends above the flange and another portion extends therebelow. A coiled compression spring 45 surrounds the plunger and bears at its upper end against the plunger guide 41 and at its lower end against the flange 44, thereby urging the plunger in a downward direction.

Within the main body 26 of the fuel pump there is positioned a rotary cam member 46 which has a center hub portion 47 and an annular cam track 48 radially spaced therefrom. The cam track 48 is circular and is provided with a high point 49. Between the upper surface of the cam track 48 and the lower end of each of the plungers 40 there is provided a timing ball 50. It will thus be evident that as the cam member 46 rotates, each time the high point 49 thereof moves below one of the plungers 40 and against the timing ball 50, it will lift the plunger momentarily. As will be more clearly pointed out hereinafter, each time the plunger is raised by the action of the cam track it will compress a quantity of fuel within the plunger guide 41, thereby opening the check valve 30 and driving an amount of fuel to the associated fuel injector.

The rotating cam member 46 has a noncircular opening therethrough adapted to receive a similar noncircular portion 51 of a shaft 52 suitably connected to a part of the engine so that when the shaft 52 is rotated the cam member 46 will likewise be rotated.

A series of ball bearings 53 rides in a track in the under surface of the cam member 46 and in a similar track in the upper surface of a fuel regulating device 54. This member 54 is externally threaded and engages internal threads 55 provided on the inner surface at the lower part of the body of the fuel pump.

Integral with the fuel regulating device 54 on the underside thereof is a pinion member 56 having teeth 57 thereon meshing with teeth 58 on the rack 59. Longitudinal movement of the rack 59 will rotate the pinion 56 and the fuel regulating member 54 integral therewith, and because of the engagement thereof with the teeth 55 will cause the regulating member 54 to be moved upwardly or downwardly. As will presently be seen, this upward and downward movement of the member 54 will control the amount of fuel delivered to each injector.

A fuel inlet 60 is connected to a suitable source of fuel supply or to an intermediate transfer pump (not shown) and delivers fuel into one of the bores 28 in the body 26 of the fuel pump 20. All of the axially extending bores 28 are interconnected by suitable passageways, for example, like that shown at 29 so that fuel entering the body of the fuel pump will be distributed around to all of the bores 28. When fuel enters the inlet 60 it will be distributed to the various bores and will also pass through the passages 61 to the inside of each plunger guide 41 when the plunger 40 therein has been moved downwardly a sufficient distance to open the passage 61. Any excess unused fuel will be delivered through the fuel outlet 62 from the fuel pump and back to the fuel supply.

It will be noted that the cam member 46 is constantly rotating and moving the various timing balls 50 in a up and down direction as they approach the high point 49 thereon. As illustrated in FIG. 4 the fuel regulating device 54 is in its uppermost position and, therefore, the cam member 46 and the timing balls 50 thereon will likewise be in their uppermost position. In this condition it will be noted that there is a space between the timing balls and each plunger 40 associated therewith when the balls are in other than their uppermost position on the high point 49 as shown at the right hand side of FIG. 4. The timing ball 50 at the left side of this figure spaced downwardly from the lower end of the plunger 40 so as to delay operation thereof as the ball moves upwardly on its track until it reaches the high point thereof, at which time the ball will contact its associated plunger moving it upwardly and compressing the fuel thereabove, thereby creating pressure to open the valve 30 and deliver a charge of fuel to the associated fuel injector.

At high speeds the fuel will start to be distributed from the pump at 30° past upper dead center of the crankshaft, and will stop at 120° after dead center.

At low speed, distribution of fuel is delayed and starts at 90° after upper dead center, but stops at 120°. Thus there will be available more fuel at high speeds and less fuel at low speeds. The pump distributes the fuel at any speed of engine until 120° past dead center. It will be evident, therefore, that, at intermediate speeds between high speed and the low or idling speed of the engine the distribution of fuel will be delayed and will start at varying degrees after upper dead center of the crankshaft between approximately the 30° for the high speeds and 90° for the low speeds.

As stated hereinabove, there is provided the usual and well known pneumatic governor between the conduit 25 in the air intake 23 and the end of the rack 59. The butterfly valve 24 is moved by manually operated mechanical means such as a pedal, thereby regulating the air intake. Depending upon how wide open the valve is the intake air to the manifold will be varied. This will vary the operation of the pneumatic governor and consequently will vary the longitudinal movement of the rack 59 to regulate the amount of rotation of the fuel regulator 54 and the amount of movement of each of the plungers 40.

The larger the quantity of air through the air intake 23 the greater will be the movement of the rack 59, which will thereupon control the fuel regulator 54 to permit a greater amount of fuel to be delivered to the fuel injector. A smaller amount of air will move the rack 59 so that a smaller amount of fuel is delivered to the fuel injector.

Figure 5:
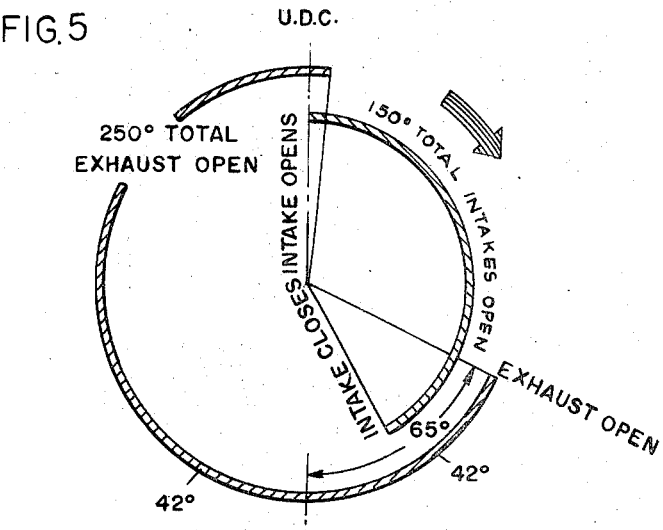
FIG. 5 is a diagram illustrating the positions of the intake and exhaust valves during one complete revolution of the crankshaft and cam shaft.

From FIG. 5 it will be noted that at the upper dead center of each piston the intake valve in each cylinder will be open and will remain open through 150° of rotation of the crankshaft and will then close 30° before lower dead center. At about 65 degrees before lower dead center the exhaust valves will open and will remain open through 250° of rotation of the crankshaft, or until 5° past upper dead center. Thus, the intake valve opens 5° of rotation prior to the closing of the exhaust valves.

Within the central bore 27 there is a stem 63 having a flange 64 thereon suitably secured within the bore. A coiled compression spring 65 bears at one end against the flange 64 and at its other end against the hub 47 on the cam member 46 thereby rejecting it in a downward direction.

From the foregoing it will be observed that I have developed a novel form of fuel pump useful in combination with the antipollution system of an internal combustion engine described above. A sufficient amount of supercharged air will have been admitted during a cycle of the engine to cause combustion of all of the gases and to clear the exhaust so that no pollutents will be emitted therefrom.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

I claim:

1. In an internal combustion engine adapted for using diesel fuel and having a plurality of cylinders therein, a crank-shaft, a piston reciprocable in each cylinder and connected to the crankshaft, an air intake manifold connected to each cylinder by a valve passage, and an exhaust manifold associated with said cylinders and connected thereto, an antipollution system which comprises, a. an intake valve associated with each cylinder,
   b. means for opening each said intake valve when the piston associated therewith is in its upper dead center position for allowing atmospheric air from the intake manifold to enter said cylinders,
   c. a fuel injector associated with each valve passage,
   d. means to actuate each said fuel injector to inject fuel into its respective valve passage at a predetermined time after the piston for each cylinder has moved to a position corresponding to a crankshaft rotation of at least 30° past upper dead center, whereby atmospheric air will enter the cylinder from the intake manifold first, and thereafter a mixture of atmospheric air and fuel from the injector will enter the cylinder,
   e. a plurality of exhaust valves associated with each of said cylinders,
   f. ports through the wall of each cylinder located above the upper end of the piston therein when in its lower dead center position, and adapted to be closed by said piston as it moves upwardly,
   g. means for admitting a charge of compressed air into each said cylinder through said ports each time said piston therein moves downwardly, whereby,
      1. a first charge of compressed air will enter the cylinder and mix with the fuel and atmospheric air therein prior to combustion, and
      2. a second charge of compressed air will enter the cylinder after combustion for cooling the cylinder walls and top of the piston, and for burning the combustion gases in the exhaust manifold, thereby to purify the exhaust gases, and
   h. means for igniting the mixture of fuel, atmospheric air and compressed air in each cylinder to drive the piston therein downwardly.

2. An antipollution system for an internal combustion engine as defined in claim 1, wherein the combined area of the openings in said exhaust valves in each cylinder is greater than the area of the opening in said intake valve associated therewith.

3. An antipollution system as defined in claim 1, wherein said means for admitting a charge of compressed air includes a centrifugal compressor for compressing air directed thereto, a manifold around said ports in said cylinders, and conduit means connecting said compressor with said last-named manifold.

4. The combination of elements defined in claim 3, including a turbine driven by the exhaust gases for driving said compressor.

5. The combination of elements defined in claim 1, including a fuel pump having a fuel inlet and outlet, and a plurality of check valves equal in number to the number of cylinders in the engine, a conduit connecting each said check valve to a fuel injector, means for opening said check valves in succession and discharging fuel therefrom to the associated fuel injector in timed relation with the opening of the associated intake valve, manually operable means to control the amount of atmospheric air entering the intake manifold, and control means operable in response to the amount of intake air to control the amount of fuel discharged from said fuel pump to the associated injector.

6. The combination of elements defined in claim 1, wherein said means to inject fuel into said cylinder is timed to stop said injection when the piston for each cylinder has moved to a position corresponding to a crankshaft rotation of approximately 120° past upper dead center.

* * * * *